United States Patent

Rinehart et al.

Patent Number: 5,276,091
Date of Patent: Jan. 4, 1994

[54] FLAME RETARDANT POLYMER WITH STABLE POLYMERIC ADDITIVE

[75] Inventors: Michael K. Rinehart, Parkersburg, W. Va.; Gerald Goldberg, Fort Meyers, Fla.

[73] Assignee: General Electric Company, Pittsfield, Mass.

[21] Appl. No.: 41,644

[22] Filed: Apr. 1, 1993

Related U.S. Application Data

[62] Division of Ser. No. 454,543, Dec. 21, 1989, Pat. No. 5,227,443.

[51] Int. Cl.$^5$ .............................................. C08G 63/48
[52] U.S. Cl. ................................................ 525/72
[58] Field of Search ......................................... 525/72

[56] References Cited

U.S. PATENT DOCUMENTS

3,947,524  3/1976  Hozumi et al. ................. 525/67
4,412,051 10/1983  de Man et al. ................. 526/271

FOREIGN PATENT DOCUMENTS

013051   7/1980  European Pat. Off. ..
013052   7/1980  European Pat. Off. ..
2428908  1/1975  Fed. Rep. of Germany ... 526/292.5
53-10689  1/1978  Japan .
58-125707  7/1983  Japan ........................... 526/292.5
63-191813  8/1988  Japan ........................... 526/292.5
1-16813   1/1989  Japan ........................... 526/292.5

Primary Examiner—Joseph L. Schofer
Assistant Examiner—N. Sarofim

[57] ABSTRACT

Polymeric compositions, such as thermoplatic molding compositions, are rendered flame retardant by blending the base polymer with a stable interpolymer prepared by copolymerizing a brominated monovinyl aromatic monomer, a methacrylic acid ester and, optionally, an ethylenically unsaturated nitrile.

4 Claims, No Drawings

FLAME RETARDANT POLYMER WITH STABLE POLYMERIC ADDITIVE

CROSS REFERENCE TO RELATED APPLICATION

This is a divisional of co-pending application Ser. No. 07/454,543 filed on Dec. 21, 1989 now U.S. Pat. No. 5,227,443.

BACKGROUND OF THE INVENTION

1. Field of the Invention

A stable, brominated polymer capable of imparting flame retardant properties is blended with one or more polymers to provide a flame retardant thermoplastic molding composition.

2. Prior Art

The use of an aryl or nuclear halogenated styrene monomer grafted onto a rubbery substrate, along with additional nonhalogenated styrene and an ethylenically unsaturated nitrile, such as acrylonitrile, is known in the art. Examples include Japanese Patent Publication No. 1978-10689 (Ikeda et al) Published Jan. 31, 1978 U.S. Pat. No. 3,947,524 (Hozumi et al). U.S. Pat. No. 4,412,051 (DeMan) describes copolymers of bromostyrene, acrylonitrile and other monomers but did not recognize the effect of methacrylate esters on miscibility.

SUMMARY OF THE INVENTION

In conducting graft reactions which use dibromostyrene as one of the grafting monomers, at least on a commercial scale, there is always the problem of premature polymerization of the dibromostyrene monomer. The latter, which will also contain a small amount of aryl mono and tri brominated styrene, is very unstable. Techniques for reducing the liklihood of spontaneous polymerization include refrigeration of the monomer during storage, transport and handling. This is very expensive and unreliable. Other approaches use a chemical stabilizer such as an alkylhydroxyamine or an iodine compound as described respectively in U.S. Pat. No. 4,885,413 (Campbell & Wozny) issued Dec. 5, 1989 and copending application U.S. Ser. No. 07/327,553 filed Mar. 23, 1989. While chemical stabilization is effective, it is still not ideal.

The present invention is directed toward a different concept entirely. The brominated styrene is reacted with additional monomers to produce a compatible preblend which can be compounded into a styrenic resin, such as ABS, to bring the total bromine content up to the desired level. This can be accomplished at or near the site where the aryl brominated styrene is produced thus obviating the requirement for shipping the monomer to another site where it would be reacted to produce the brominated ABS. The polymeric additive, being a stable, solid polymeric material, can be transported and handled easily and safely. This also makes it economically feasible to transport the product globally.

In making reference to styrenic graft polymers in this specification, the term is understood to include ABS type polymers, the molecules of which contain two or more polymeric parts of different compositions that are bonded chemically. The polymer is preferably prepared by polymerizing a conjugated diene, such as butadiene, or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

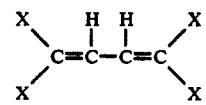

wherein X is selected from the group consisting of hydrogen, alkyl groups containing from one to five carbon atoms, chlorine or bromine. Examples of dienes that may be used are butadiene, isoprene, 1,3-heptadiene, methyl-1,3pentadiene, 2,3-dimethylbutadiene, 2-ethyl-1,3-pentadiene; 1,3-and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

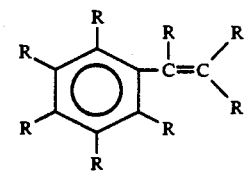

wherein R is selected from the group consisting of hydrogen, alkyl groups of 1 to 5 carbon atoms, cycloalkyl, alkyl, aryl, alkaryl, aralkyl, alkoxy, aryloxy and halogen. Examples of substituted vinylaromatic compounds include styrene, 4-methylstyrene, 3,5-diethylstyrene, 4-n-propylstyrene, α-methylstyrene, α-methyl vinyltoluene and mixtures of two or more of such monomers. In the present invention the ABS itself would not normally include a halogenated monomer because the bromine is provided by the polymeric additive. The preferred monovinylaromatic hydrocarbons used are styrene and/or α-methylstyrene.

A second group of monomers that may be polymerized in the presence of the prepolymerized backbone are acrylic monomers such as acrylonitrile, substituted acrylonitrile, and/or acrylic acid esters, exemplified by acrylonitrile, and alkyl methacrylates such as methyl methacrylate.

The acrylonitrile, substituted acrylonitrile, or acrylic acid esters are described generically by the following formula:

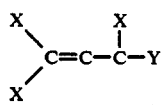

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate.

In the preparation of the conventional (low to medium rubber content) ABS graft polymers, the conjugated diolefin polymer or copolymer exemplified by a 1,3-butadiene polymer or copolymer comprises about 15-30% by weight of the total graft polymer composition. The monomers polymerized in the presence of the backbone, exemplified by styrene and acrylonitrile, comprise from about 85 to about 70% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprises from about 30 to about 70% by weight of the total graft polymer composition.

In preparing the polymer, it is normal to have a certain percentage of the polymerizing monomers that are grafted on the backbone combine with each other and occur as free, rigid copolymer. If styrene is utilized as one of the grafting monomers and acrylonitrile as the second grafting monomer, a certain portion of the composition will copolymerize as free styrene-acrylonitrile copolymer. Similarly, in the case where α-methylstyrene (or another monomer) is substituted for the styrene, in whole or in part, a copolymer may be formed such as α-methylstyrene-acrylonitrile copolymer.

Also, there are occasions where a rigid polymer or copolymer, such as α-methylstyrene-acrylonitrile copolymer may be added to the graft ABS by mechanical blending. The rigid polymers and copolymers which may be so added may be based on one or more of the following: monovinylaromatic compounds, methacrylic acid esters of $C_1$–$C_4$ aliphatic alcohols, acrylonitrile, substituted acrylonitrile and imidized maleic anhydride derivatives which are unsubstituted or substituted with an alkyl or aryl group. Examples of these rigid copolymers which may be added to the ABS graft polymer include polymethylmethacrylate (PMMA), copolymers of methyl methacrylate with one or more of the $C_1$–$C_4$ acrylates, styrene, α-methylstyrene and/or acrylonitrile, and the like. Such rigid copolymers may be prepared by emulsion, bulk, suspension, bulk suspension or solution polymerization methods which are well known in the art.

In a preferred embodiment of the invention, the ABS resin contains at least 70 wt % of the diene rubber backbone and little or no free rigid polymers or copolymers are included in the molding composition. In an alternative preferred embodiment, the ABS resin contains at least 50 wt % of the diene rubber backbone and at least a small amount of rigid polymers or copolymers are included in the molding composition.

An important aspect of the invention resides in the use of a particular recipe and proportions of ingredients which promotes the compatibility or miscibility between the flame retardant terpolymer and the rigid phase, usually styrene-acrylonitrile (SAN) copolymer, in the ABS. As noted above, the SAN copolymer may be formed in the ABS reaction but is often added as a separate component by blending with a high rubber ABS graft. The terpolymer contains an aryl brominated vinyl aromatic compound, preferably dibromostyrene, an ethylenically unsaturated nitrile, preferably acrylonitrile, and a lower alkyl methacrylate, preferably methylmethacrylate, copolymerized together. The terpolymer thus described is mechanically blended with an ABS graft and optionally a second rigid, such as SAN, to produce the flame retardant polymer.

Problems with miscibility begin to appear when the overall dibromostyrene content rises above about 45 wt %. At lower levels it is not absolutely necessary to include the methylmethacrylate. Above 45% miscibility is dramatically improved by the addition of the methyl methacrylate.

DETAILED DESCRIPTION OF A PREFERRED EMBODIMENT

The invention can be best understood by referring to the following examples.

EXAMPLE 1

A dibromostyrene based polymer was prepared by emulsion polymerization in accordance with the following recipe:

| Material | Parts |
| --- | --- |
| Initial Soap Charge | |
| Demineralized Water | 40.000 |
| Emulsifier (fatty acid soap) | 1.000 |
| Activator Solution | |
| Demineralized Water | 10.000 |
| Refined Dextrose | 0.462–0.647 |
| TSPP - Tetra Sodium pyrophophate | 0.035–0.049 |
| $FeSO_4 \cdot 7H_2O$ | 0.005–0.007 |
| Soap Solution | |
| Demineralized Water | 120.000 |
| Fatty Acid Soap | 1.000 |
| KOH | 0.000–0.200 |
| Monomer Solution | |
| Dibromostyrene | 45.000–83.100 |
| Styrene, Acrylonitrile, α-methylstyrene, and/or Methylmethacrylate | 16.900–55.000 |
| Dodecylmercaptan (Chain Transfer Agent) | 0.270–0.378 |
| Initiator | |
| Cumene hydroperoxide | 0.500–0.700 |

The process began with the charge of the initial soap solution into the reactor followed by purging with nitrogen at 0.1 SCF/hour and heating the reactor to 62° C. The Activator Solution is then charged in a batch and the pumps started for the soap and monomer as well as the CHP metering pump. The soap and monomer were pumped for 100 minutes and the CHP for 110 minutes; the polymerization reaction was continued from 110 to 170 minutes. The latex was coagulated with a dilute (1.5 pph) $H_2SO_4$ solution at a 2:1 dilute coagulant to latex ratio at boiling temperature. The recovered latex was washed three times with potable water and dried for 24 hours in an air circulating oven at 160° F.

EXAMPLES 2-5

Example 1 was repeated using varying amounts of dibromostyrene, acrylonitrile and styrene. The compositions of each are summarized in Table I.

TABLE I

| Sample | 1 | 2 | 3 | 4 | 5 |
|---|---|---|---|---|---|
| Dibromostyrene | 45 | 55 | 65 | 75 | 83.1 |
| Acrylonitrile | 24.7 | 22.6 | 20.6 | 18.5 | 16.9 |
| Styrene | 30.3 | 22.4 | 14.4 | 6.5 | 0 |

Samples 1-5 were tested to determine their miscibility with a styrene-acrylonitrile copolymer. Aliquot portions of each sample of the dibromostyrene-acrylonitrile-(optional) styrene was mixed with a 72/28 styrene/acrylonitrile copolymer in such a ratio to result in an overall dibromostyrene content of 27 wt. %. This would be fairly typical of the desired bromine content in a flame retardant polymer. The polymers were mixed in a Brabender mixing head at 100 rpm and 410° F. for 5 minutes. The resultant blend was then compression molded into 2.5"×0.07" discs at 320° F. The optical properties of the disks were tested on a Hunter Colorimeter. A haze reading of 20% or less indicates miscibility. The results are summarized in Table II:

TABLE II

| Sample No. | 1 | 2 | 3 | 4 | 5 |
|---|---|---|---|---|---|
| % Haze | 18.3 | 62.3 | 81.3 | 86.7 | 86.7 |

To determine the effect of the amount of acrylonitrile in the dibromostyrene polymer on the miscibility with the SAN copolymer, two additional samples were prepared in the same manner as described above with the dibromostyrene level at 65%—the same as sample No. 3. Once again the dibromostyrene was blended with a 72/28 SAN so that the overall dibromostyrene content was 27%. The recipes and the results of the Miscibility Test are set forth in Table III below.

TABLE III

| Sample No. | 3 | 6 | 7 |
|---|---|---|---|
| Dibromostyrene | 65 | 65 | 65 |
| Acrylonitrile | 20.6 | 15.4 | 26.4 |
| Styrene | 14.4 | 19.6 | 8.6 |
| % Haze | 81.3 | 85.6 | 87.2 |

All of the above polymers exhibited poor miscibility with the SAN copolymer.

The substitution of additional monomers for the styrene component brought about a profound change in the miscibility, at least in one instance. Examples 8 and 9 substituted 14.4% of alpha methylstyrene and methylmethacrylate, respectively, for all of the styrene. The Miscibility test was run for these examples and compared to No. 3 which contained an equivalent amount of styrene. The results are summarized in Table IV.

TABLE IV

| Sample No. | 3 | 8 | 9 |
|---|---|---|---|
| Dibromostyrene | 65 | 65 | 65 |
| Acrylonitrile | 20.6 | 20.6 | 20.6 |
| Styrene | 14.4 | — | — |
| α-Methylstyrene | — | 14.4 | — |
| Methylmethacrylate | — | — | 14.4 |

TABLE IV-continued

| Sample No. | 3 | 8 | 9 |
|---|---|---|---|
| Haze | 81.3 | 86.8 | 6.5* |

*Average of two runs

The preferred proportions to achieve excellent miscibility of the interpolymer are: 10-20 wt. % methylmethacrylate, 15-25 wt. % acrylonitrile and 55-75 wt. % dibromostyrene. Having determined the general miscibility requirements, various ABS formulations were prepared and the flame retardant properties measured. The materials were prepared in a manner similar to that described in connection with the dibromostyrene polymer-SAN blend. Standard test bars were molded to the standards required for the flammability tests.

The formulations and test results are summarized in Table V.

TABLE V

| Composition | 10 | 11 | 12 | 13 |
|---|---|---|---|---|
| DBS Polymer No.1 | 49.1 | — | — | — |
| DBS Polymer No.3 | — | 41.5 | — | — |
| DBS Polymer No.9 | — | — | 41.5 | 41.5 |
| ABS (15/50/35) | 40 | 40 | 40 | — |
| ABS (7.5/70/22.5) | — | — | — | 28.6 |
| SAN (72/28) | 10.9 | 18.5 | 18.5 | 29.9 |
| Total Resin | 100 | 100 | 100 | 100 |
| Compounding Additives | 16.9 | 16.9 | 16.9 | 16.9 |
| Miscibility | Good | Poor | Excellent | Excellent |
| PROPERTIES | | | | |
| Melt Viscosity (1000/sec@450° F.) (poise) | 3800 | 3656 | 3489 | 3720 |
| Notched Izod Impact (⅛ × ½@RT) (ft-lb/in) | 2.8 | 1.8 | 2.2 | 2.8 |
| Dynatup(10 Disks) (ft-lb) Failure (50.00%) | 15.0 | 11.1 | 15.5 | 12.8 |
| Heat Deflection Temp (⅛ × ½ IMU) (°F.) | 177 | 176 | 168 | 174 |
| Tensile Strength (psi) | 5245 | 5150 | 4920 | 4950 |
| Flexural Modulus (× E05) | 3.5 | 3.5 | 3.5 | 3.5 |
| Flammability Test (0.060 × ½ IM) | 94VO | 94VO | 94VO | 94VO |
| 5V Burn Test (One Bar) (0.060 × ½ IM) | | | Pass | |

Sample 10 which contained the DBS Polymer having the smallest amount of dibromostyrene and Samples 12 and 13 which contained the polymer with methyl methacrylate exhibited the best miscibility without loss of physical properties.

The preceding examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A flame retardant molding composition comprising 21-70 wt. % graft polymer containing a rubbery diene substrate onto which is grafted a monovinyl aromatic monomer and an ethylenically unsaturated nitrile, 0-53 wt. % copolymer of a monovinyl aromatic monomer and an ethylenically unsaturated nitrile and 32-60 wt. % of a flame retardant polymeric additive comprising an interpolymer of 55-75 wt. % aryl brominated monovinyl aromatic monomer, 0-10 wt. % non-halogenated vinyl aromatic monomer, 15-25 wt. % ethylenically unsaturated nitrile and 10-20 wt. % lower alkyl methacrylic acid ester.

2. The composition as defined in claim 1 wherein the total dibromostyrene content, based on the overall weight of the molding composition, is at least 12 wt. %.

3. A flame retardant molding composition comprising: A) 21–70 wt. % of an ABS graft polymer containing 30–70 wt. % butadiene, 7–25 wt. % acrylonitrile and 19–53 wt. % styrene, B) 0–53 wt. % of a copolymer containing 65–75 wt. % styrene and 25–35 wt. % acrylonitrile, and C) 32–60 wt. % of a flame retardant additive comprising an interpolymer of 55–75 wt. % dibromostyrene, 15–25 wt. % acrylonitrile and 10–20 wt. % methylmethacrylate.

4. A flame retardant molding composition comprising a flame retardant polymeric additive comprising an interpolymer of 55–75 wt. % aryl brominated monovinyl aromatic monomer, 0–10 wt. % non-halogenated vinyl aromatic monomer, 15–25 wt. % ethylenically unsaturated nitrile and 10–20 wt. % lower alkyl methacrylic acid ester.

* * * * *